(12) United States Patent
Rafter et al.

(10) Patent No.: US 7,761,323 B2
(45) Date of Patent: Jul. 20, 2010

(54) METHOD AND SYSTEM FOR SCHEDULING A CUSTOMER SERVICE CALLBACK

(75) Inventors: John Rafter, Nashville, TN (US);
Donald C. Lewis, Bell Buckle, TN (US);
Jerry David Rawle, Hendersonville, TN (US); Mark Irwin, Spring Hill, TN (US); Suzanne Artemieff, Harvard, MA (US)

(73) Assignee: Aspect Software, Inc., Lombard, IL (US)

( * ) Notice: Subject to any disclaimer, the term of this patent is extended or adjusted under 35 U.S.C. 154(b) by 1308 days.

(21) Appl. No.: 10/546,460

(22) PCT Filed: Oct. 8, 2003

(86) PCT No.: PCT/US03/32043
§ 371 (c)(1),
(2), (4) Date: Aug. 19, 2005

(87) PCT Pub. No.: WO2005/045723
PCT Pub. Date: May 19, 2005

(65) Prior Publication Data
US 2006/0167729 A1 Jul. 27, 2006

(51) Int. Cl.
*G06F 9/46* (2006.01)
(52) U.S. Cl. ....................................................... 705/9
(58) Field of Classification Search .................. 705/9
See application file for complete search history.

(56) References Cited

U.S. PATENT DOCUMENTS

| 4,805,209 A | 2/1989 | Baker, Jr. et al. |
| 4,924,491 A | 5/1990 | Compton et al. |
| 4,964,077 A | 10/1990 | Eisen et al. |
| 5,040,208 A | 8/1991 | Jolissaint |
| 5,155,761 A | 10/1992 | Hammond |
| 5,181,236 A | 1/1993 | LaVallee |
| 5,185,780 A | 2/1993 | Leggett |
| 5,185,782 A | 2/1993 | Srinivasan |
| 5,185,786 A | 2/1993 | Swick |
| 5,214,688 A | 5/1993 | Szlam et al. |

(Continued)

FOREIGN PATENT DOCUMENTS

EP 0426361 B1 3/1995

(Continued)

OTHER PUBLICATIONS

Hunter, "Just plain rude", http://www.smartmoney.com/stockcloseup/index.cfm?story=20000714,(Jul. 14, 2000),5 pgs.

(Continued)

*Primary Examiner*—Romain Jeanty
(74) *Attorney, Agent, or Firm*—Husch Blackwell Sanders Welsh Katz

(57) ABSTRACT

A method and system for scheduling a callback time for customer service. The system calculates estimated handling resources for a customer interaction system (14) and forecasts a customer service transaction workload for the estimated handling resources of the customer interaction system (14). The system then determines the scheduled callback time based upon the estimated handling resources and the forecasted customer service transaction workload.

83 Claims, 10 Drawing Sheets

U.S. PATENT DOCUMENTS

| | | | |
|---|---|---|---|
| 5,239,617 | A | 8/1993 | Gardner et al. |
| 5,247,569 | A | 9/1993 | Cave |
| 5,283,824 | A | 2/1994 | Shaw |
| 5,289,368 | A | 2/1994 | Jordan et al. |
| 5,329,581 | A | 7/1994 | Friedes et al. |
| 5,333,180 | A | 7/1994 | Brown et al. |
| 5,335,268 | A | 8/1994 | Kelly et al. |
| 5,357,564 | A | 10/1994 | Gupta et al. |
| 5,467,391 | A | 11/1995 | Donaghue et al. |
| 5,502,761 | A | 3/1996 | Duncan et al. |
| 5,506,890 | A | 4/1996 | Gupta |
| 5,511,112 | A | 4/1996 | Szlam |
| 5,546,452 | A | 8/1996 | Andrews et al. |
| 5,555,179 | A | 9/1996 | Koyama et al. |
| 5,581,602 | A | 12/1996 | Szlam et al. |
| 5,590,188 | A | 12/1996 | Crockett |
| 5,627,884 | A | 5/1997 | Williams et al. |
| 5,638,431 | A | 6/1997 | Everett et al. |
| 5,668,856 | A | 9/1997 | Nishimatsu et al. |
| 5,692,033 | A | 11/1997 | Farris |
| 5,719,932 | A | 2/1998 | Roybal |
| 5,724,404 | A | 3/1998 | Garcia et al. |
| 5,727,129 | A | 3/1998 | Barrett et al. |
| 5,739,919 | A | 4/1998 | Lee et al. |
| 5,765,033 | A | 6/1998 | Miloslavsky |
| 5,796,952 | A | 8/1998 | Davis et al. |
| 5,799,292 | A | 8/1998 | Hekmatpour |
| 5,838,781 | A | 11/1998 | Isaksson |
| 5,848,143 | A | 12/1998 | Andrews |
| 5,867,568 | A | 2/1999 | Ackerman et al. |
| 5,870,769 | A | 2/1999 | Freund |
| 5,875,296 | A | 2/1999 | Shi et al. |
| 5,875,422 | A | 2/1999 | Eslambolchi et al. |
| 5,877,757 | A | 3/1999 | Baldwin et al. |
| 5,890,164 | A | 3/1999 | Nielsen |
| 5,911,134 | A | 6/1999 | Castonguay |
| 5,926,539 | A | 7/1999 | Shtivelman |
| 5,940,614 | A | 8/1999 | Allen et al. |
| 5,946,387 | A | 8/1999 | Miloslavsky |
| 5,951,652 | A | 9/1999 | Ingrassia, Jr. et al. |
| 5,953,332 | A | 9/1999 | Miloslavsky |
| 5,953,405 | A | 9/1999 | Miloslavsky |
| 5,963,635 | A | 10/1999 | Szlam et al. |
| RE36,416 | E | 11/1999 | Szlam et al. |
| 5,991,395 | A | 11/1999 | Miloslavsky |
| 6,002,760 | A | 12/1999 | Gisby |
| 6,018,724 | A | 1/2000 | Arent |
| 6,021,428 | A | 2/2000 | Miloslavsky |
| 6,044,145 | A | 3/2000 | Kelly et al. |
| 6,044,355 | A * | 3/2000 | Crockett et al. ............ 705/8 |
| 6,044,368 | A | 3/2000 | Powers |
| 6,047,261 | A | 4/2000 | Siefert |
| 6,067,357 | A | 5/2000 | Kishinsky et al. |
| 6,108,711 | A | 8/2000 | Beck et al. |
| 6,138,139 | A | 10/2000 | Beck et al. |
| 6,167,395 | A | 12/2000 | Beck et al. |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,259,786 | B1 | 7/2001 | Gisby |
| 6,263,066 | B1 | 7/2001 | Shtivelman |
| 6,278,978 | B1 | 8/2001 | Andre et al. |
| 6,310,630 | B1 | 10/2001 | Kulkarni et al. |
| 6,345,305 | B1 | 2/2002 | Beck et al. |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,556,974 | B1 | 4/2003 | D'Alessandro |
| 6,563,921 | B1 | 5/2003 | Williams et al. |
| 6,574,329 | B2 | 6/2003 | Takeuchi et al. |
| 6,577,713 | B1 | 6/2003 | Peterson et al. |
| 6,584,191 | B1 | 6/2003 | McPartlan et al. |
| 6,732,156 | B2 | 5/2004 | Miloslavsky |
| 6,771,760 | B1 * | 8/2004 | Vortman et al. ........ 379/209.01 |
| 6,826,745 | B2 | 11/2004 | Coker et al. |
| 6,850,613 | B2 * | 2/2005 | McPartlan et al. ..... 379/265.02 |
| 6,868,154 | B1 | 3/2005 | Stuart et al. |
| 6,931,112 | B1 | 8/2005 | McFarland et al. |
| 6,970,829 | B1 * | 11/2005 | Leamon ......................... 705/9 |
| 2002/0105957 | A1 | 8/2002 | Bondarenko et al. |

FOREIGN PATENT DOCUMENTS

| | | |
|---|---|---|
| JP | 10173780 | 6/1998 |
| WO | WO-9941895 | 8/1999 |

OTHER PUBLICATIONS

"Aspect Communications Introduces Winning Combination for Businesses and Their Customers", *PR Newswire*, Obtained from ProQuest, Document No. 287569981,(Feb. 11, 2003),1 pg.

"Blue Pumpkin—Forecasting and Scheduling", http://www.bluepumpkin.com/products/wfosuite/director.html, 2 pgs. Date Accessed: Aug. 16, 2005.

"Blue Pumpkin Advisor Enterprise Product Brief", 4 pgs Date Accessed: Aug. 16, 2005.

"Blue Pumpkin Advisor Express—Product brief", 2 pgs Date Accessed: Aug. 16, 2005.

"Blue Pumpkin Director—Enterprise", 4 pgs Date Accessed: Aug. 16, 2005.

"Blue Pumpkin director—essential", 2 pgs Date Accessed: Aug. 16, 2005.

"Blue Pumpkin planner—product brief", 2 pgs. Date Accessed: Aug. 16, 2005.

"Blue Pumpkin workforce—optimization suite", 6 pgs Date Accessed: Aug. 16, 2005.

BusinessMap -to www.destinationcrm.com/articles/default.asp?ArticleID=4963, 3 pgs. (Mar. 18, 2005).

"International Search Report for PCT/US3/32043", (Dec. 10, 2004).

"Merging Performance Optimization with workforce management", *BusinessMap* at http://www.destinationcrm.com/articles/default.asp?ArticleID=3996, 3 (Apr. 6, 2004).

"Productivity & Proficiency Management: Blue Pumpkin Advisor", http://www.blue-pumpkin.com/products/wfosuite/advisorexpress.html, 3 pgs.

"Scheduler", http://www.iex.com/TotalView/scheduling.htm, 2 pgs.

"SS7—Signaling System 7", *Webopedia Definition and Links*, http://webopedia.internet.com/TERMS/SS7.html,(Jul. 12, 2000),1-2.

"Time and Activity Monitoring: Blue Pumpkin Activity Manager", http://www.bluepumpkin.com/products/wfosuite/activitymgr.html.

"Workschedule 5.1 (description)", 2 pgs.

Bhulai, S , et al., "A queueing model for call blending in call centers", *IEEE Transactions on Automatic Control*, 48(8), (Aug. 2003),1434-1438.

Brandt, A , et al., "Modelling and optimization of call distribution systems", *ITC-15 (International Teletraffic Congress)*, (1997),133-144.

Brandt, A , et al., "On a two-queue priority system with impatience and its application to a call center", *Methodology and Computing in Applied Probability*, 1(2), (Aug. 1999),191-210.

Brandt, A , et al., "On the M(n)/M(n)/s queue with impatient calls", *Performance Evaluation*, 35, (1999),1-18.

Gamache, Michel , et al., "The Preferential Bidding System at Air Canada", *Transportation Science*, 32(3) Aug. 1998, 246-255.

Gans, N , et al., "A call-routing problem with service-level constraints", *Operations Research*, 51(2), (Apr. 2003),255-271.

Gans, N. , et al., "Telephone Call Centers: Tutorial, Review, and Research Prospects", *Manufacturing & Service Operations Management*, 5, (2003),79-141.

Hunter, Robert , "Just Plain Rude", *Smart Money Today: Stock Close-Up*; Smart Money.com;, (Jul. 14, 2000),1-4.

Mandelbaum, A , et al., "Strong Approximations for Markovian Service Networks", *Queueing Systems*, 30, (1998),149-201.

* cited by examiner

| HISTORICAL DATA TABLE 53 |||
|---|---|---|
| Historical Wait Times 65 | Historical Transaction Times 66 | Historical Handling Resources 67 |

| EVENT SCHEDULE TABLE 54 |||
|---|---|---|
| Callback Time 70 | Selected Media Switch 71 | Event Status 72 |

| CUSTOMER INFORMATION TABLE 56 |||
|---|---|---|
| Caller Data 77 | Caller Address 78 | Communication Protocol 79 |

| RESOURCE FORECAST TABLE 58 ||||||
|---|---|---|---|---|---|
| Forecast Time Interval 84 | Forecasted Contacts 85 | Forecasted Time to Advance 86 | Scheduled Handling Resources 87 | Resources Required 88 | Open for Event 89 |

| CALL/RESOURCE TRACKING TABLE 60 ||||||
|---|---|---|---|---|---|
| Calls in Queue 94 | Scheduled Callbacks 95 | Average Handle Time 96 | Average Time to Advance 97 | Resources Available 98 | Estimated Wait Time 99 |

Fig 6

Customer Interaction System 14

METHOD AND SYSTEM FOR SCHEDULING A CUSTOMER SERVICE CALLBACK

CLAIM OF PRIORITY

This application is a U.S. National Stage Filing under 35 U.S.C. 371 from International Patent Application No. PCT/US2003/032043 filed on Oct. 8, 2003, and published in English as WO 2005/045723 A1 on May 29, 2005, which applications are incorporated herein by reference.

FIELD OF THE INVENTION

The present invention relates generally to the field of customer service callbacks and, in one exemplary embodiment, to offering a callback time based upon estimated handling resources and forecasted customer service transaction workloads.

BACKGROUND OF THE INVENTION

A number of businesses offer their customers customer support via the telephone. Often, the customer service agents are busy so the business places the customer's telephone on hold and places the customer's request for service in a queue from where such requests are retrieved as customer service agents become available. Once retrieved, the customer's phone is taken off hold and the customer is able to talk to an agent. In some instances, the customer is even informed of how long she can expect to wait on hold. Oftentimes this wait time is based on past data corresponding to average wait times associated with the customer's position in the queue. In other instances, the customer is informed of the estimated wait, the request for service is placed in a queue, but the customer is offered a callback rather than being placed on hold. If the customer accepts the offer to be called back, both the system and the customer hang up but the system continues to keep track of the customer's position in the queue. When the customer's request eventually comes to the front of the queue, the system initiates a phone call back to the customer. A problem with this scheme is the estimated wait is tightly coupled to the condition of the queue at the time of the initial call. Further, callback attempts are unlikely to occur at a time dose to the time implied by the estimated wait. Due to variations in resources, staffing, and transaction types, it is typically the case that, when the customer's service request actually arrives at the front of the queue, the actual wait time has substantially deviated from the estimate given to the customer. Lastly, the customer is only given the choice of accepting or rejecting the callback offer. The customer has no control over the schedule of when a callback will be attempted

SUMMARY OF THE INVENTION

According to one aspect of the present invention, there is a provided method of scheduling a callback time for customer service. The method includes calculating estimated handling resources for a customer interaction system, forecasting a customer service transaction workload for the estimated handling resources of the customer interaction system, and determining the scheduled callback time based upon the estimated handling resources and the forecasted customer service transaction workload.

Other features of the present invention will be apparent from the accompanying drawings and from the detailed description that follows.

BRIEF DESCRIPTION OF THE DRAWINGS

FIG. 6 is a database diagram illustrating selected fields from the event schedule table, caller information table, resource forecast table, and call/resource tracking table, according to an exemplary embodiment of the present invention;

DETAILED DESCRIPTION

A method and system for scheduling a callback time for customer service are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a customer interaction system that can offer and schedule a callback time based upon calculating estimated handling resources for a customer interaction system and forecasting a customer service transaction workload for the estimated handling resources of the customer interaction system. The customer interaction system then determines the scheduled callback time based upon the estimated handling resources and the forecasted customer service transaction workload.

Figure 1:
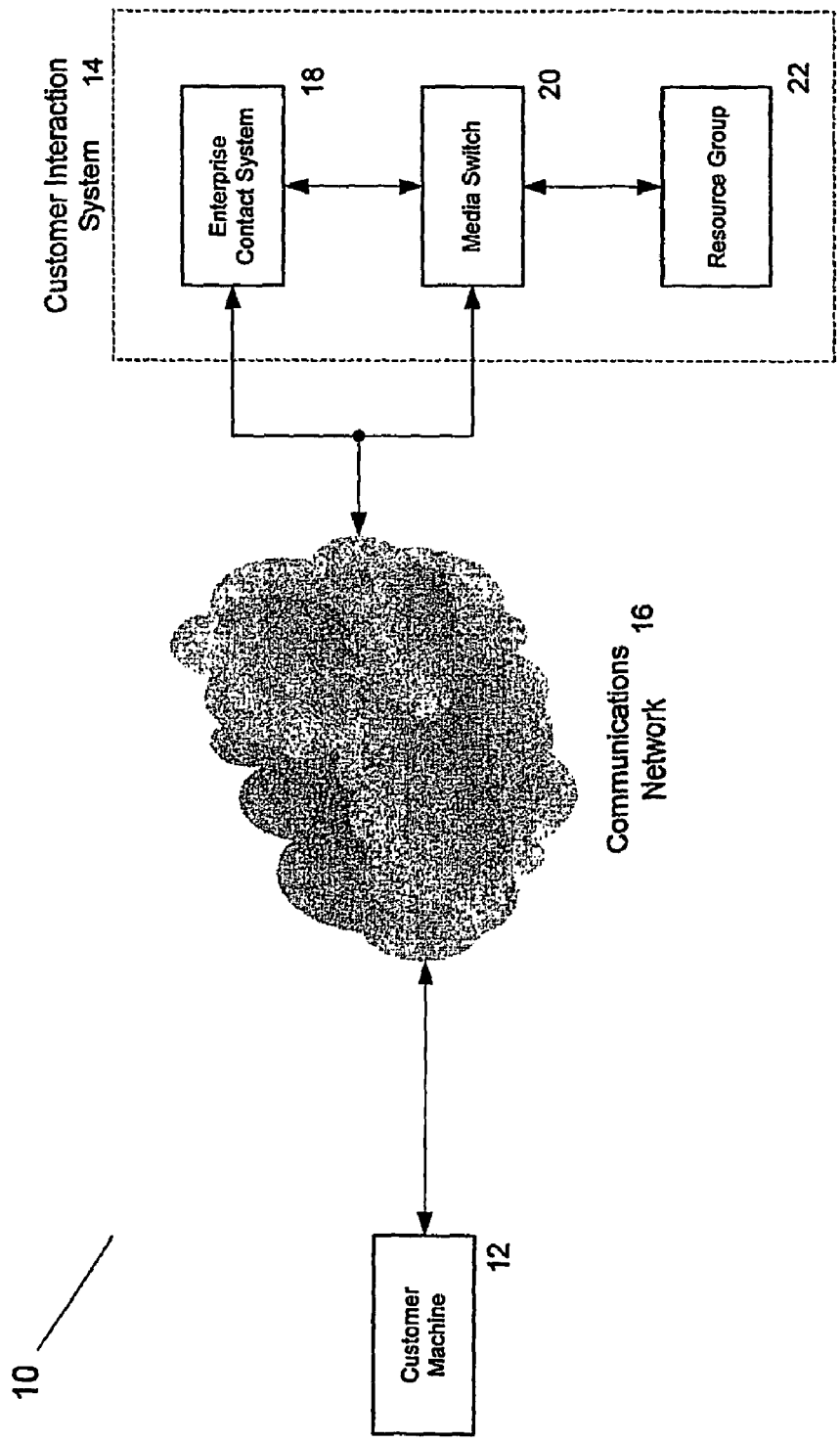
FIG. 1 is a block diagram illustrating a system to offer and schedule a callback time for customer service within a customer interaction system, according to an exemplary embodiment of the present invention.

FIG. 1 is a block diagram illustrating a system 10 to offer and schedule a callback time for customer service, according to an exemplary embodiment of the present invention. The system 10 includes a customer machine 12 and a customer interaction system 14 that communicate via communications network 16. The communications network 16 may be embodied as the Internet, a LAN (local area network), a WAN (wide area network), PSTN (public switch telephone network), frame relay, ATM (asynchronous transfer mode), satellite communications, Wireless communications, combinations thereof, or any other network equipment or protocol that enables electronic communication between the above described network entities. The customer machine 12 enables the customer to access customer support services that are provided by the customer interaction system 14.

The customer interaction system 14 includes an enterprise contact machine 18, at least one media switch 20, and a resource group 22. The customer interaction system 14 may, for example, provide customer service support for customers in a given marketplace. For example, a customer may purchase a digital camera and experience technical difficulties that require customer support. The customer then may choose to contact customer support through the customer interaction system 14 via the communications network 16. A customer communication is received at a media switch 20 and processed by the enterprise contact machine 18. In one embodiment, the customer waits in a queue for a connection to the resource group 22. In another embodiment, the customer chooses to accept a callback time for a connection to resource group 22 offered by the customer interaction system 14.

Figure 2:
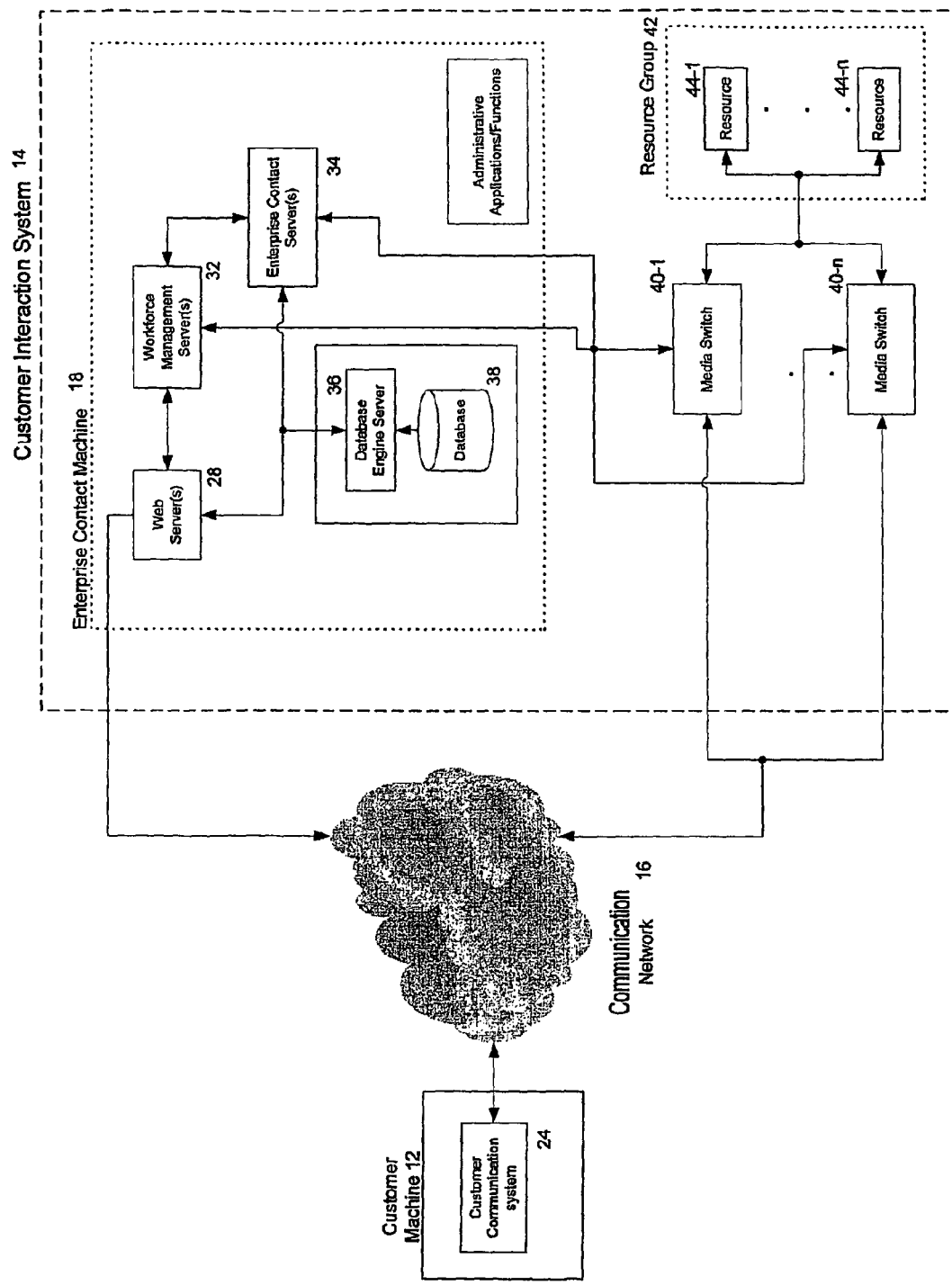
FIG. 2 is a block diagram illustrating software and hardware components of the customer interaction system and the customer machine, according to an exemplary embodiment of the present invention.

FIG. 2 is a block diagram illustrating software and hardware components of the customer interaction system 14 and the customer machine 12, according to an exemplary embodiment of the present invention.

In addition to other software and hardware components that are not illustrated, the customer machine 12 includes a customer communication system 24. In one embodiment, the customer machine 12 may be a communication device such as, but not limited to, a computer system, a landline telephone (PSTN), a satellite phone, a fax machine, or any of a variety of wired or wireless communication devices. The customer communication system 24 enables a user to access the customer interaction system 14 by, merely for example, an instant messaging or online chat interface, such as MSN Messenger developed by Microsoft™ corporation of Redmond, Wash. In yet another embodiment, the customer communication system 24 enables a user to display web pages that are loaded from server computers. The client communication system 24 may be embodied as a browser such as, the Microsoft Internet explorer browser developed by Microsoft™ Corporation or Navigator™ browser developed by Netscape of Mountain View, Calif. The customer communication system 24 embodied as a browser or instant messenger executes under an operating system such as, Microsoft™ Windows developed by Microsoft™ Corporation or Mac OS X developed by Apple Computers of Cupertino, Calif.

The enterprise contact machine 18 includes one or more of a number of servers, namely communication and processing servers in exemplary form of a web server 28 that can engage in instant messaging and deliver web pages (e.g., mark up language documents), a workforce management (WFM) server 32 that may track current handling resources, calculate estimated handling resources for future service, and forecast customer service transaction workloads for those handling resources, an enterprise contact server 34 that can schedule and initiate a callback, and a database engine server 36, which maintains and facilitates access to a database 38. In one embodiment, the web server 28 can be connected directly to the communications network 16, while in another embodiment, the servers are connected indirectly to the communications network 16 via media switches 40-1 through 40-n (e.g., automatic call distributors).

The customer interaction system 14 includes at least one media switch 40-1 communicatively coupled to the communications network 16, the enterprise contact servers 34, the workforce management servers 32, and the resource group 42. Media switches 40-1 through 40-n can support any one or all of the following protocols: PSTN voice, Voice over Internet Protocol (VoIP), or instant messaging (IM) protocol. Resource group 42 includes at least one resource 44-1. Resources 44-1 through 44-n can include, but are not limited to, any one or a combination of a human resource, a speech recognition system, or an interactive voice response (IVR) system. Additionally, the media switches 40-1 though 40-n can be located within various geographic regions such that there may be a local or non-local toll charge with respect to the resource group 42 or the customer machine 12. For example, media switch 40-1 may be local to the resource group 42 but not local to the customer machine 12, while switch 40n may be local to the customer machine 12 but not local to the resource group 42.

Figure 3:
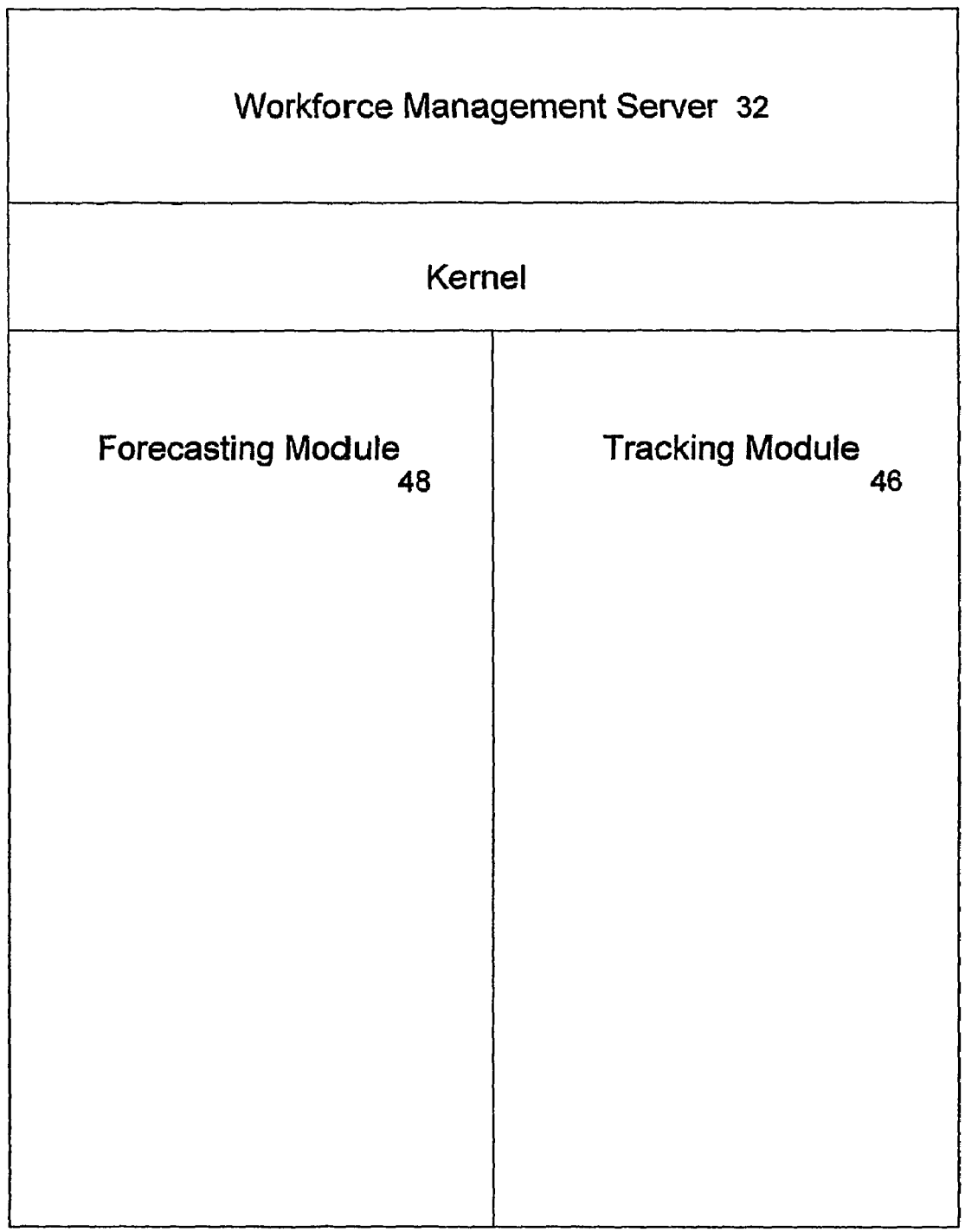
FIG. 3 is a block diagram illustrating an exemplary embodiment of a tracking module and a forecasting module operating on the workforce management server of the enterprise contact machine.

FIG. 3 is a block diagram illustrating an exemplary embodiment of a tracking module 46 and a forecasting module 48 operating on the workforce management server 32 of the enterprise contact machine 18. The tracking module 46 executes under kernel operating software to scan the database 38 coupled to the database engine server 36 for resource information.

The forecasting module 48 executes under kernel operating software to provide forecast information such as, forecasted number of contacts, forecasted average handle time, and forecasted abandoned calls. Additionally, the forecasting module 48 may obtain data from any one or all of the media switches 40-1 through 40-n including but not limited to the number of calls in a queue, the average handle time, the average time to advance a call, the number of resources logged on, and the number of resources available.

Figure 4:
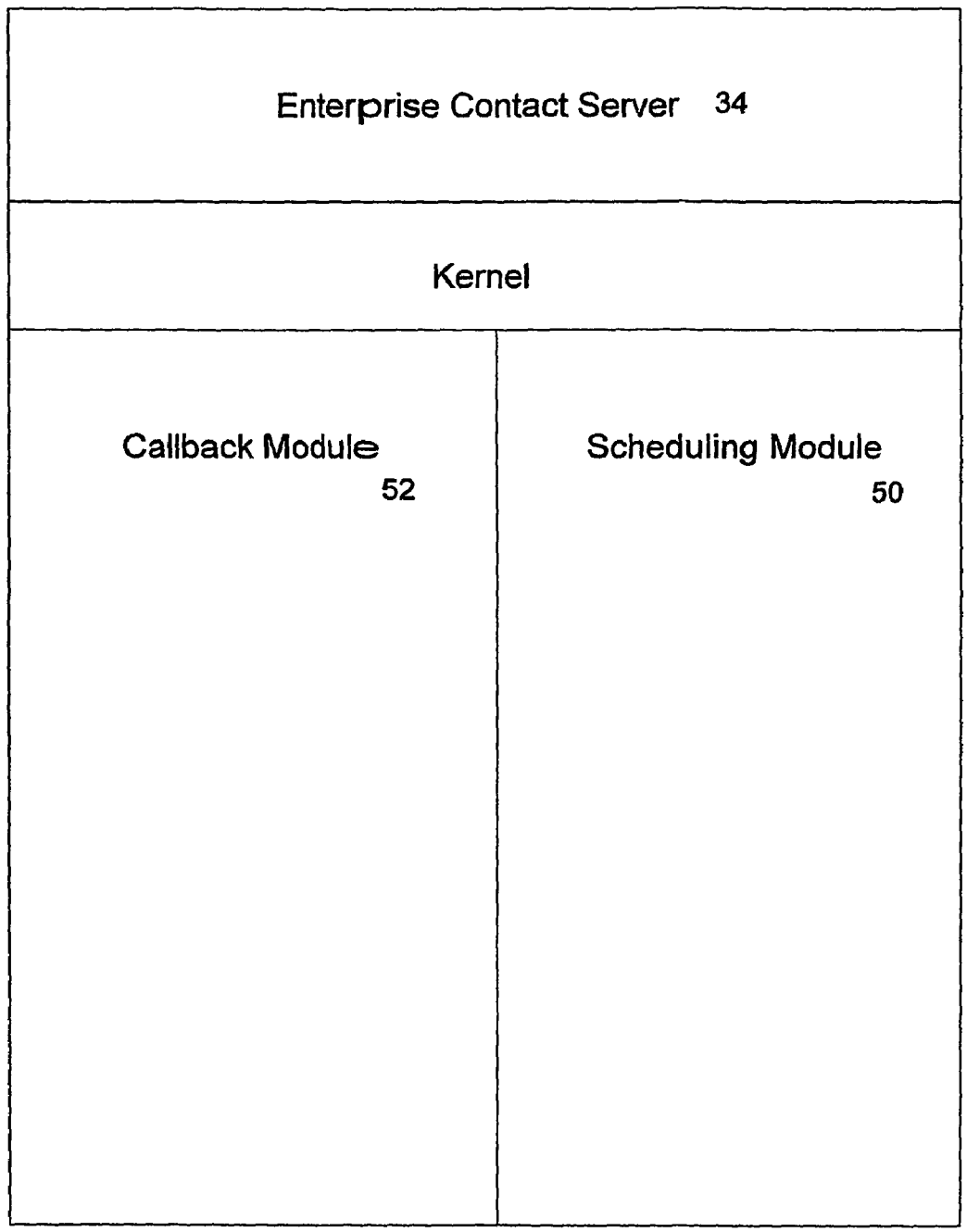
FIG. 4 is a block diagram illustrating an exemplary embodiment of a scheduling module operating on the enterprise contact server of the enterprise contact machine.

FIG. 4 is a block diagram illustrating an exemplary embodiment of a scheduling module 50, operating on the enterprise contact server 34 of the enterprise contact machine 18. The scheduling module 50 executes under kernel operating software to schedule and store a callback time for customer service. The callback module 52 executes under kernel operating software to initiate a callback through a media switch when the scheduled callback time arrives.

In another embodiment, media switch and/or resource group information can be uploaded to the database 38 through any one of, the enterprise contact server 34, the workforce management server 32, or the web server 28 via the database engine server 36. Once uploaded, the tracking module 46, the forecasting module 48, the scheduling module 50, or the callback module 52 may access the data from database 38.

Figure 5:
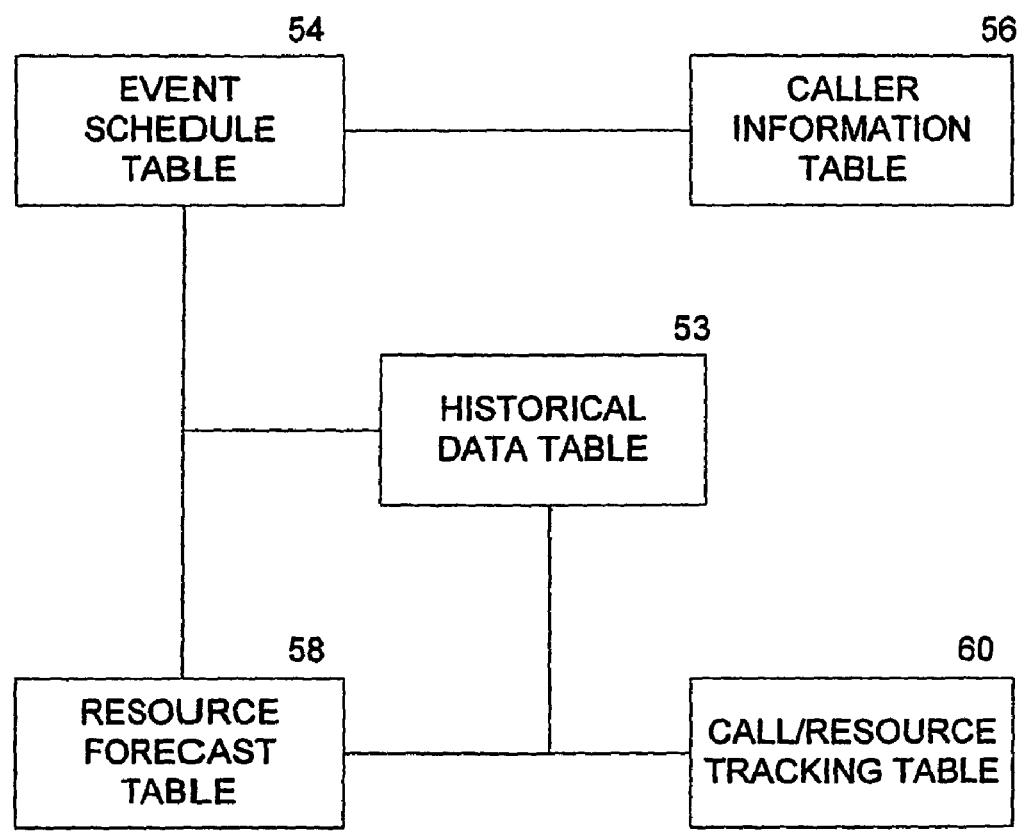
FIG. 5 is a database diagram illustrating an exemplary database maintained by a database engine server that supports the customer interaction system.

FIG. 5 is a database diagram illustrating tables within the exemplary database 38, which is maintained by and accessed via the database engine server 36. The database 38 may, in one exemplary embodiment, be implemented as a relational database, and includes a number of tables having entries, or records, that are linked by indices and keys. In an alternative embodiment, the database 38 may be implemented as a collection of objects in an object-oriented database.

The database 38 includes a historical database table 53 that may be linked to an event schedule table 54, resource forecast table 58 and call/resource tracking table 60. The event schedule table 54 may also be linked to a caller information table 56 and the resource forecast table 58. The resource forecast table 58 could also be linked to the call resource tracking table 60.

The database 38, via database engine server 36, may be read from or written to by any other servers in the enterprise contact machine 18.

FIG. 6 provides a diagrammatic representation of database 38, including selected fields from the historical data table 53, the event schedule table 54, the caller information table 56, the resource forecast table 58, and the call/resource tracking table 60, according to one exemplary embodiment of the present invention.

The historical data table 53 includes records that contain historical wait times 65, historical transaction times 66, and historical resource schedules 67. The event schedule table 54 includes records that contain a callback time 70, a selected media switch 71, and an event status data 72. In one embodiment, the event status data 72 indicates whether a scheduled callback attempt was successful or not.

The caller information table 56 includes caller records critical to scheduling and initiating a callback. These records include caller data 77, a caller address 78, and a communication protocol 79. The caller data 77 may include information such as, for example, name, user name, and location. The caller address record 78 may include, for example, a telephone number, a user name for an instant messaging service, and/or an email address. The communication protocol 79 indicates what type of communication protocol will be used for the callback. Such protocols can include, for example, the Voice over IP (VoIP) protocol, an instant messaging protocol, fax, or PSTN.

The resource forecast table 58 includes records that indicate forecasts of a customer service transaction workload for actual and estimated handling resources associated with the customer interaction system 14. These records include a forecast time interval 84, forecasted contacts 85, a forecasted time to advance 86, forecasted calls abandoned 82, resources scheduled 87, resources required 88, and an open for event record 89.

The forecast time interval 84, according to one embodiment of the present invention, is a predetermined future window of time used by the workforce management server 32 to calculate the estimated handling resources and to forecast the customer service transaction workload for the estimated handling resources of the customer interaction system 14. A forecasted contacts record 85 is the projected number of customer communications for the given forecast time interval. The records for the number of resources scheduled 87 and the number of resources required 88 are also dependent upon the forecast time interval 84. The open for event record 89 indicates whether or not an event, such as a callback, can be scheduled within the forecast time interval.

The call/resource tracking table 60 includes records that include call and resource data regarding the customer interaction system 14. These records include calls in queue 94, scheduled callbacks 95, average handle time per call 96, average time to advance 97, resources available 98, and the estimated wait time 99.

Figure 7:
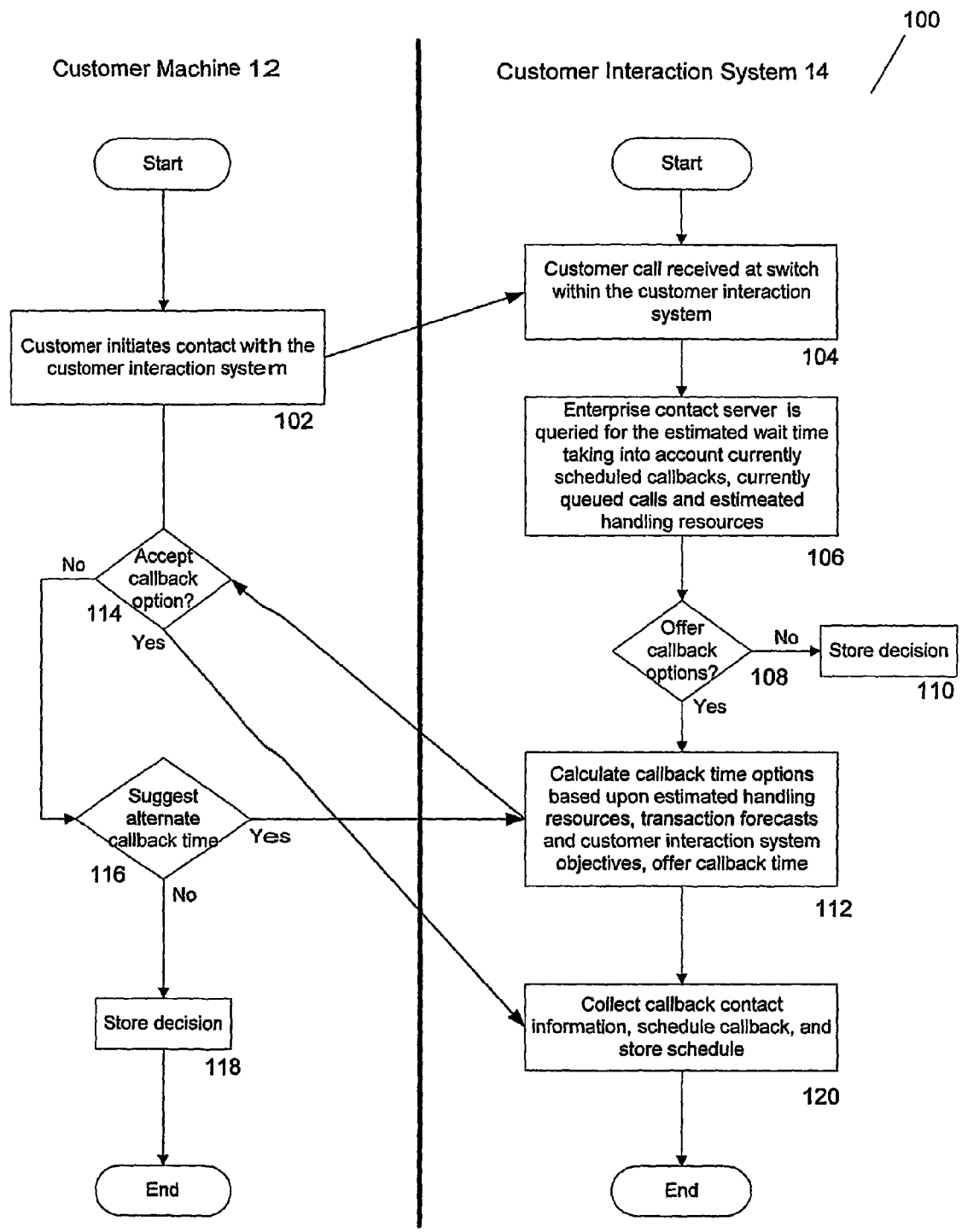
FIG. 7 is a flowchart illustrating a method, according to an exemplary embodiment of the present invention, wherein a customer interaction system offers a customer on a customer machine an option to schedule a callback for customer service from the customer interaction system.

FIG. 7 is a flowchart illustrating a method 100, according to an exemplary embodiment of the present invention, whereby a customer interaction system 14, in response to an incoming customer service request, offers a customer, on a customer machine 12, an option to schedule a callback for customer service from the customer interaction system 14. In varying embodiments, the customer service request comes from a telephone or wireless device, a web page service request form, or an instant messaging application whereby a callback schedule agent can respond with callback time options. In another embodiment, the customer initiates a request for a callback from the customer interaction system 14.

At box 102, the customer initiates a contact with the customer interaction system 14. The customer interaction system 14 receives the customer call at a switch configured to receive the customer's chosen communications protocol.

The enterprise contact server 34, at box 106, is then queried for the expected wait time that has been calculated and stored in the database 38. The enterprise contact server 34 uses records from the historical data table 53, event schedule table 54 and resource tracking table 60 to calculate the expected wait time, as discussed with reference to FIG. 8. An estimate of how long a customer will have to wait before being connected to an agent is used to decide whether or not to offer the customer the option to be called back by the system at some future time. At box 108, if the estimated wait time is less than a configurable threshold time, then the callback option will not be offered and the decision will be stored at box 110. The configurable threshold time may vary from time interval to time interval and may be configured by an enterprise contact system administrator.

According to one exemplary embodiment of the present invention, the wait time may be estimated by the enterprise contact server 32, which computes the average time it has taken calls to advance one place in the queue during the recent past. In other words, the server 32 may compute an average of the historical transaction times for a predetermined forecast time interval. When a new call arrives, an estimate of the wait can be obtained by multiplying this average time to advance by the number of calls currently in the queue to yield a forecasted time to advance. This wait time provides an estimate of the expected wait under the assumption that the handling resources are constant over the recent past and the near future. An improved estimate may be obtained by taking into account the variability of the available handling resources. In one embodiment, the workforce management server 32 accesses the historical transaction times 66 and the historical handling resources 67 from the database 38 to perform a regression calculation of the average time to advance during the recent past against the handling resources available at the time the previous advance occurred. The result is data, such as a forecasted average time to advance 86 as a function of currently scheduled handing resources 87, that can be used to provide an estimated wait time 99. When a new call arrives, an estimate of the wait for a queue of size n can be computed as follows. Note, the number calls in queue can be found in the database 38. Let $t_0$ be the current time. Let $a_0$ be average time to advance based on an estimate of the available resources at time $t_0$. Let $t_1=t_0+a_0$. Let $a_1$ be the average time to advance based on an estimate of the available resources at time $t_1$. Let $t_2=t_1+a_1$. In general, let $a_{j-1}$ be the average time to advance based on an estimate of the available resources at time $t_{j-1}$. Let $t_j=t_{j-1}+a_{j-1}$. Then $t_{n+1}-t_0$ estimates the wait time for a queue of size n. This wait time is an estimate of the expected wait for the case when handling resources vary in time.

In another embodiment, the estimated wait time may be a confidence wait time. To compute the confidence wait time, a probability distribution $p(t;n)$ is determined for the wait time, given a queue of size n. A confidence level, c, is set (where $0<c<1$). The $c \times 100\%$ confidence wait time is then defined as the time, T, such that $\text{Prob}\{t<T\}=c$ for the distribution, $p(t;n)$. A simple way to approximate the probability distribution, $p(t;n)$, is to assume that the time for each advance in the queue is exponentially distributed with a mean that is the average time to advance over the recent past. Then $p(t;n)$ can be expressed as a scaled gamma distribution with parameter n+1. That is:

$$p(t;n)=t^n e^{-t/a}/a^{n+1}\Gamma(n+1)$$

where "a" is the average time to advance.

The confidence wait time conveniently reflects the increasing uncertainty and the change in the shape of the distribution of the wait time as the as size of the queue increases. An expected wait time does not. For example, if the callback system is configured to offer a callback when the 95% confidence wait time is greater than 15 minutes (the configured threshold value), that means that a customer will be offered a callback when the probability they will have to wait more than 15 minutes is greater then 5% and that statement is true no matter what the size of the queue. On the other hand, if the customer is offered a callback when an expected wait time is greater than 15 minutes, the probability that the customer would have to wait more than 15 minutes depends on the size of the queue.

Figure 8:
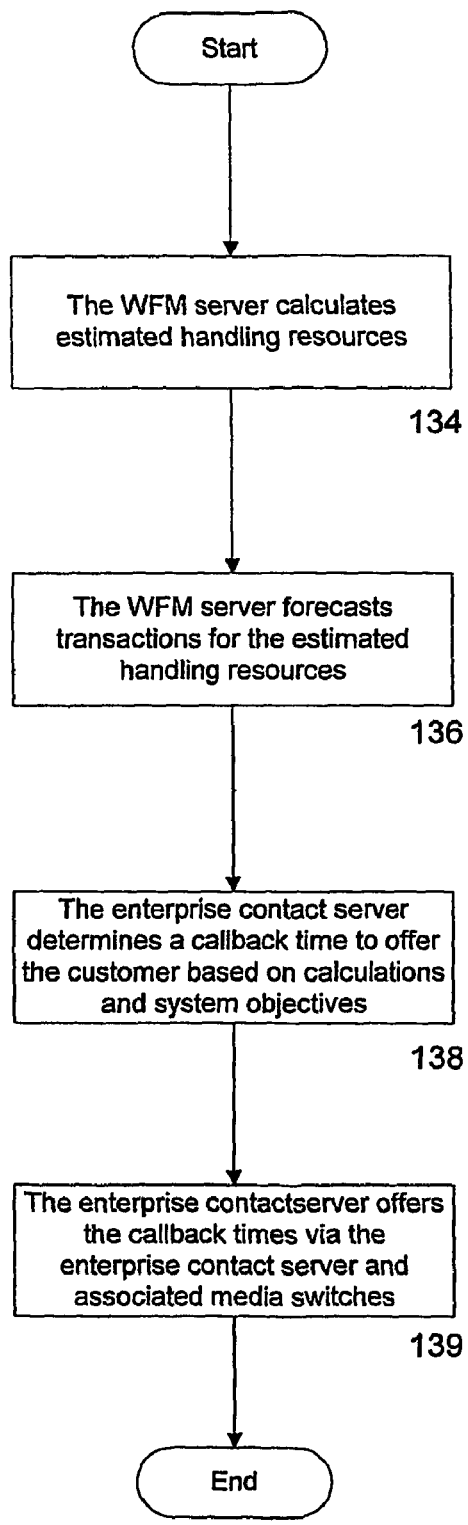
FIG. 8 is a flowchart illustrating a method, according to an exemplary embodiment of the present invention, wherein the customer interaction system initiates the callback at or near the arrival of the scheduled callback time.

If the estimated wait time is greater than a configurable threshold time, the customer interaction system 14, at box 112, calculates callback time options, as illustrated in FIG. 8, and offers these options to the customer. At box 114, if the customer declines to accept any of the callback options, the customer interaction system 14 prompts the customer to suggest an alternate callback time. For example, if the customer contact is via a telephone, the customer may select an alternate callback time via an interactive voice response (IVR) system. If the customer declines to suggest or select an alternate callback time, at box 116, the customer interaction system 14 stores the decision at box 118 and ends the session. If the customer inputs an alternate callback time, the customer interaction system 14, based upon the alternate callback time, calculates callback time options based upon estimated handling resources, transaction forecasts, and customer interaction system objectives and generates a set of new callback times to offer, at box 112. However, if at box 114, the callback option is accepted, the customer interaction system 14, at box 120, collects the customer's callback contact information, schedules a callback, and stores the callback information in the database 38. In various embodiments, callback information can be collected according to the communications protocol used. For example, an IM chat session could use an agent to collect customer contact information over an IM dialog box, a telephone contact could use an ANI (automatic number identification service) coupled to the enterprise contact server 34, or for a web contact, by an HTML POST to web service that can communicate with the enterprise contact server 34 via the web server 28.

FIG. 8 is a flowchart illustrating a method 130, according to an exemplary embodiment of the present invention, whereby the tracking module 46 and forecasting module 48 of workforce management server 32 estimate resources and transactions for future time intervals. The enterprise contact server 34 uses these estimates to calculate the callback time options to offer the customer. At box 132, the workforce management server 32, responsive to the enterprise contact server 34 determining that a callback should be offered, calculates estimated handling resources for the customer interaction system 14. In one embodiment, the customer interaction system 14 has previously scheduled resources, as indicated in the resource forecast table 58, so that, at any future time, some subset of resources is available to handle callbacks exclusively. In this case, forecasting module can provide, for future time intervals such as the time intervals at or near the callback time, the mean number of resources so scheduled or staffed as an estimate of the handling resources for that given time interval.

In one embodiment, the time interval is configurable and the mean number of resources scheduled is calculated by the forecasting module 48 from the historical resource schedule data from history table 61. Subject to this scheduling constraint, improved estimates can be obtained when the tracking module 46 tracks the actual mean number of resources that have been available to handle callbacks over a number of time intervals in the recent past. The deviations calculated by the tracking module 48 between the actual (e.g., observed) mean number of available resources and the scheduled mean number of available resources over time intervals in the recent past then can be used to correct the estimate based on scheduling alone. The correction can be determined by any number of regression techniques applied to the past deviations. Among these, the most basic is a simple linear regression of actual mean against scheduled mean available resources. In this case, the "line of regression" provides an estimate of the mean number of available resources during some future time interval, which estimate is a (non-homogeneous) linear function of the mean number of scheduled resources for that period.

Alternatively, a weighted linear regression in which the weights decrease with the age of the deviations (e.g., exponentially with the age) can be used to produce the correction. In this case, the correction provided by the line of regression reflects the deviations of the recent past more strongly than those of the less recent past. Additionally, but still subject to the scheduling constraint of exclusive callback resources, corrections can also be informed by tracking deviations into the remote past, an a priori stochastic model, or both. In these cases, a parameterized conditional probability distribution expressing actual (e.g., observed) mean number given scheduled mean number of available resources is assumed. The historical data such as, historical resource schedules and historical transaction times, and/or a priori considerations are used to enforce constraints upon the parameters of this distribution. The remaining degrees of freedom among the parameters are then free to vary in time. Therefore, recent past deviations can be used to constrain those remaining degrees of freedom and thereby implicitly estimate all the distribution's parameter values in effect during any time interval. The estimated mean number of available resources available during some future time interval can be obtained as the maximum likelihood estimate of mean number of available resources for the conditional distribution with the estimated parameters, given the scheduled number of available resources.

In another embodiment, the resources that are, exclusively handling callbacks are grouped subject to constraints that different sets of resource groups are available for different types of callbacks. In this case, any estimate of future handling resources (e.g., a mean number of available resources) for a type of callback may take into account that any available resource may be shared among different types of callback. In one embodiment, the scheduling module 50 apportions equal fractions of a resource to handle each type of callback for which the resource is available. However, since different types of callbacks will arise at different rates and consume different amount of an resource's available time, it is appropriate to correct each fraction to be the ratio of callback work of the given type to the sum of all the callback work for all the types of callback the resource may handle during any time period when the resource is available. In this way, the estimate of future handling resources for a particular type of callback becomes dependent upon a forecast of callback incidence and type. In other embodiments, the estimate can be corrected and refined by use of regression against the recent past deviations, obtained from the tracking module 46, subject to constraints imposed by historical resource data or a priori considerations.

In yet another embodiment, there is no requirement that resources handle callbacks exclusively, but only that a predetermined percentage of a resource's labor is apportioned exclusively for callback work. These percentages are used to deflate the estimates for average number of resources available as compared to what the estimates would be were resources working on callback exclusively. This can be done for the case of resource groups and call types, and such estimates also can be corrected and refined by regression. In an exemplary embodiment, a system administrator enters this percentage allocation into the customer interaction system 14.

At box 136, the workforce management server 32 forecasts transactions that will be associated with the estimated handling resources. The forecast module 48 configures, for each time interval, default values, stored in the resource forecast table 58, for describing the forecasted contacts and the forecasted handling time for each resource handling each contact. In another embodiment, these forecast values are the result of a regression and/or trend analysis of historical data and may be informed by a business model of future transactions that anticipates changes in the incidence or handle time not reflected in the historical data. The values offered by the forecast module 48 are typically interpreted as estimates of the (time-varying) parameters of (exponential) probability distributions that capture the stochastic nature of the forecast transactions. In this way, both expected values and confidence limits for forecasted contacts and forecasted handling time can be obtained. The estimates of the parameters can be corrected by the tracking module 46 tracking the actual values of contacts and handling times over the recent past; these actual values may be used to compute maximum likelihood estimates of the distributions' parameters for this recent past. A regression of the observed parameter estimates against the forecast parameter estimates over time intervals of the recent past can be used to correct the forecast for a future time interval. This forecast, calculated by the forecast module 48, can be used to determine when there is a positive net staffing, whereby the number of resources staffed exceeds the required number of resources staffed for a given predefined time interval.

In another embodiment, the contacts are typed, and for each type of contact the forecast module 48 provides a forecast of the incidence of contacts and the handle time for any time interval. Now the values for each type of contact are subject to the same sort of refinement and correction as referenced above in the previous embodiment. These refinements and corrections may be applied either independently for each contact type or simultaneously for all contact types.

At box 138, the enterprise contact server 34 determines a callback time to offer a customer based upon the estimated handling resources and the forecast transaction workload supplied by the forecast module 48. The enterprise contact server 34 must determine suitable times for a callback from some time interval, for example, [t1, t2], where t1 is greater than the current time plus an estimated wait time. In one embodiment, the interval, [t1, t2], is provided by the customer, and the callback system seeks a time based on the availability of resources that are working on callbacks. The callback system knows when callbacks have been already scheduled, so it can estimate the handling resources already committed at any time in [t1, t2]. The workforce management server 32 can estimate the available handling resources. The difference is the handling resources that are free to be scheduled for new callbacks.

In general, this difference varies over [t1, t2]. Any time, in [t1, t2], when this difference is greater than the resources required to handle the current call is a candidate for the callback time. For exemplary purposes, these callback times are called candidate times. For any time, in [t1, t2], let the resource excess be the available handling resources minus the handling resources needed for previously scheduled callbacks minus the resources required to handle the current call. In these terms, a time in [t1, t2] is a candidate time whenever the resource excess is positive or, in other words, there is positive net staffing. If there are such candidate times, the system may select a small number of them, suggest them to the customer, and ask the customer to choose one. (The maximum number of callback times suggested may be determined by a configurable bound.) Alternatively, a callback time may be selected based on a time within [t1, t2] where the net staffing is at a maximum for the given period. Typically, there will be many times in [t1, t2] when it is appropriate to schedule a callback. For this reason, it is possible to choose which times are suggested to the customer by different criteria that achieve different system objectives, such as next available time, best staffing time, or least cost.

For a system objective of next available time, according to an exemplary embodiment, a configured time delay, d, is employed, as well as the configured bound, n, on the number of suggested times. If there is no candidate time in [t1, t2], the customer is prompted for a new time interval or the offer to callback withdrawn. Otherwise, the earliest candidate time, T1, in [t1, t2] is suggested. A second candidate time, T2, is suggested where T2 is the earliest candidate time such that T1+d<T2<=t2. A third candidate time, T3, is suggested where T3 is the earliest candidate time such that T2+d<T3<=t2, and so on, until the number of suggested times equals the configured bound, n, or there are no such candidate times.

For a system objective of best staffing time, according to another embodiment, a configured time delay, d, is employed, as well as the configured bound, n, on the number of suggested times. Suggest a time in [t1, t2] when the excess is a maximum. Suggest k other times such that the pair-wise difference between the times is at least d, each time is in [t1, t2], k is the largest integer less than or equal to n−1 for which there are such times, and such that the least excess among the k times is greatest.

For an exemplary embodiment of a system objective of least cost, a configured time delay, d, is employed, a configured bound, n, on the number of suggested times is given, and a cost associated with making a callback from a particular media switch to the callback addresss (e.g., phone number) is known. In this case, select an optimal media switch, specifically a media switch with least cost. Either the next available or best staffing suggested times are found then for the handling resources associated with that switch.

At box 139, the enterprise contact server 34 and media switches 40-1 through 40-n offers the customer the callback option. For example, if the customer contact is via the web, a dialog window may be configured to display the callback times and prompt the customer to select one or by interactive voice response if contact is by telephone. In another embodiment, the customer contact is via an instant messaging (IM) application and the callback time or times are offered in a dialog box associated with the IM application by a callback schedule agent.

Figure 9:
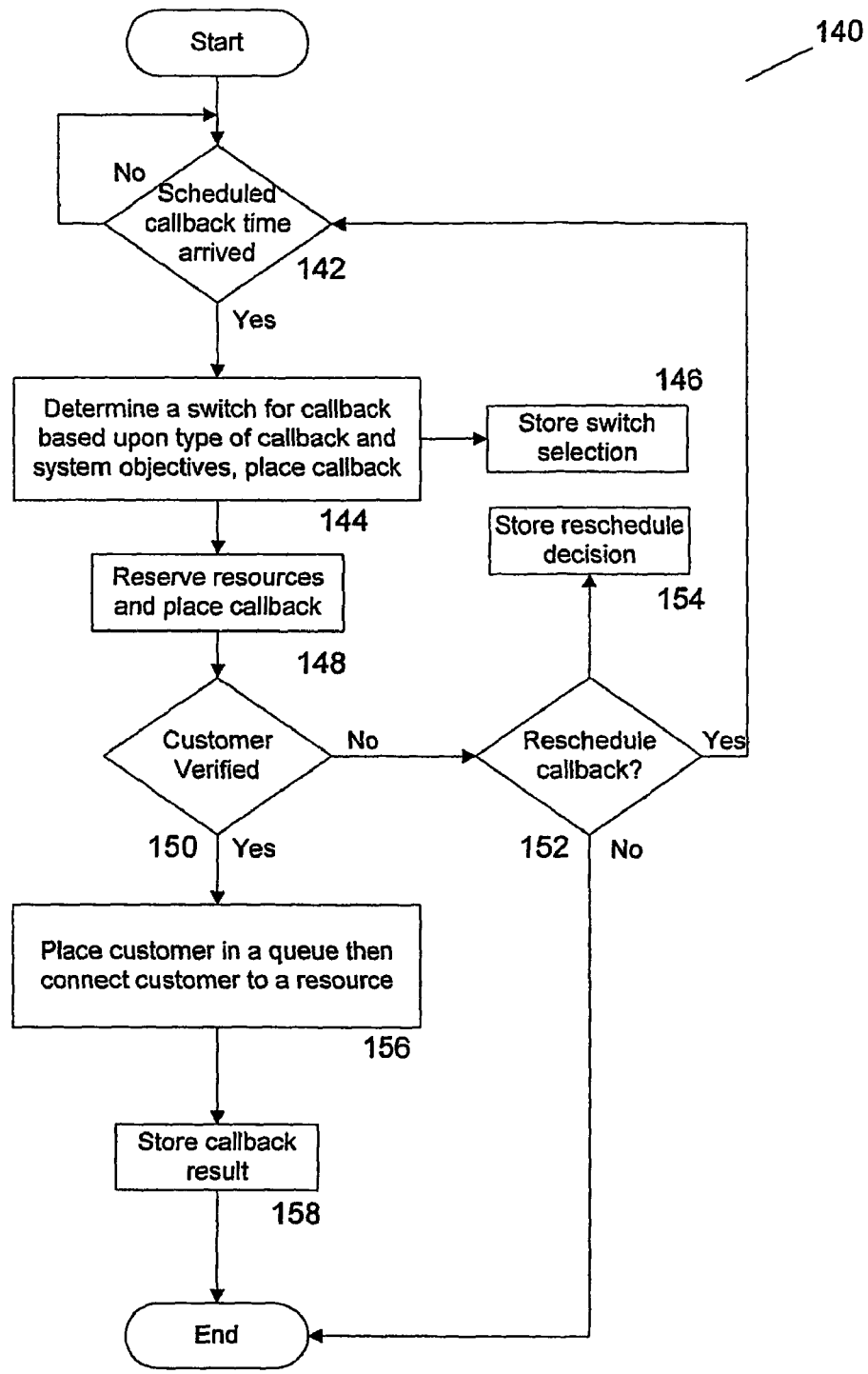
FIG. 9 is a flowchart illustrating a method, according to an exemplary embodiment of the present invention, wherein the scheduling module of the enterprise contact server triggers the callback module to initiate the callback at the approximate scheduled callback time.

FIG. 9 is a flowchart illustrating a method 140, according to an exemplary embodiment of the present invention, wherein the scheduling module 50 of the enterprise contact server 34 triggers the callback module 52 to initiate the callback at the approximate scheduled callback time. At box 142, once the scheduled callback time arrives, the callback module 52 retrieves, from the database 38, caller data 77, caller address 78 (e.g., phone number) and caller communication protocol 79 (e.g., telephone, IM chat, etc.). The callback module 52 then determines, at box 144, an appropriate switch for callback based upon the communication protocol and system objectives, as discussed with reference to FIG. 8.

At box 146, the media switch selected for callback is stored in the event schedule table 54 and the customer information table 56 of the database 38. At box 148, the media switch places the callback. In one embodiment, the enterprise contact server 34 may reserve resources for the callback prior placing the call on the media switch. If the customer fails to respond to the callback, at box 150, the scheduling module 50 may be configured to reschedule a callback at box 152. For example, if there is no answer, the customer interaction system 14 may be configured to automatically reschedule a callback at intervals for a fixed number of times as configured by a callback system administrator. In another embodiment, the rescheduling occurs at a time when resources are also predicted to be available. At box 154, the decision to reschedule the callback is stored in the database 38 under event status 72. If the customer interaction system 14 does reschedule a callback, at box 152, the process returns to waiting for the scheduled callback time to arrive at box 142. If the customer interaction system 14 is configured not to reschedule a callback, the session ends. However, if the customer does respond to the callback, at box 150, the callback module 52 verifies the customer by asking for an affirmative response to previously acquired caller data or assigned ID (identifier). The response may vary according to protocol used. For example, a telephone callback may use an IVR system to detect a voice response to a question regarding a name, or for an IM callback, the response will be typed into the IM interface. Once verified, the callback module 52 places the customer into the customer service queue at a callback priority ranking and connects the customer to a resource or a previously reserved resource when the top of the queue is reached, at box 156. In an exemplary embodiment, the priority ranking may put the customer at the front of the queue or, conditionally, place the customer in queue for a reserved callback resource. At box 158, the result of the callback is stored in the database 38 under event status 72.

Figure 10:
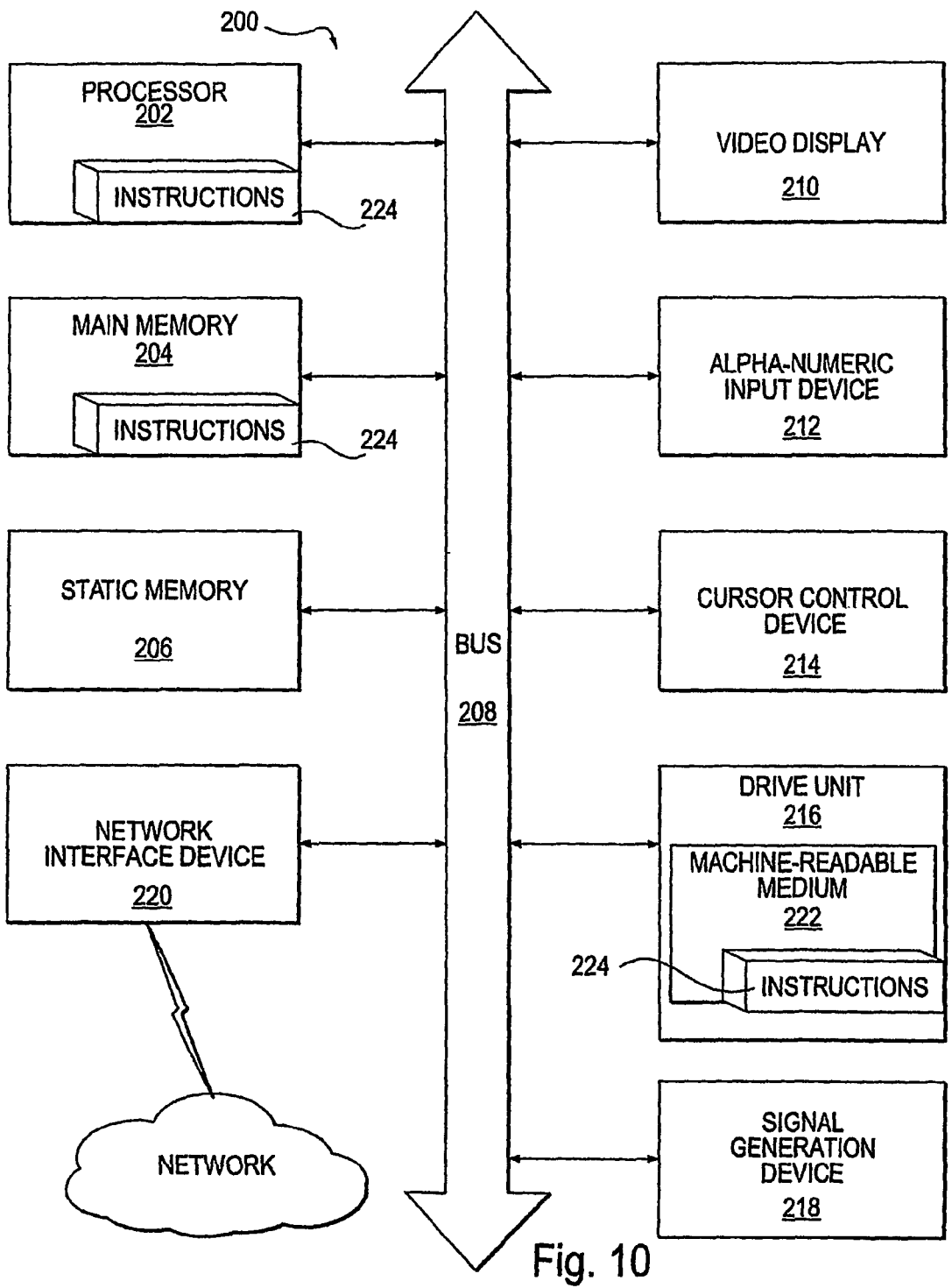
FIG. 10 illustrates a diagrammatic representation of a machine in the exemplary form of a computer system wherein a set of instructions can be executed to cause the machine to perform any one or more of the methodologies discussed herein.

FIG. 10 illustrates a diagrammatic representation of a machine in the exemplary form of a computer system 200 wherein a set of instructions can be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system to schedule a callback time for customer service have been described. Although the present invention has been described with reference to specific exemplary embodiments, it will be evident that various modifications and changes may be made to these embodiments without departing from the broader spirit and scope of the invention. Accordingly, the specifications and drawings are to be regarded in an illustrative rather than a restrictive sense.

The invention claimed is:

1. A method of scheduling a callback time for customer service, the method including:
   calculating by a processor an estimated total amount of handling resources available during a future time interval for a customer interaction system;
   forecasting in a processor a customer service transaction workload for the estimated handling resources of the customer interaction system, including determining expected values and confidence limits for forecasted transactions and forecasted handling times for the future time intervals;
   determining the scheduled callback time based upon the estimated handling resources and the forecasted customer service transaction workload; and
   wherein the calculating and the forecasting includes using a predetermined forecast time interval for the estimated handling resources and the customer service transaction workload, and the calculated estimate of handling resources is a mean number of resources scheduled which is corrected based on deviation between an actual mean number of available resources and the scheduled mean number of resources over recent past time intervals.

2. The method of claim 1, wherein the calculating of the estimated handling resources includes projecting resource availability based on times resources are scheduled.

3. The method of claim 1, wherein the calculating of the estimated handling resources includes determining net staffing at the callback time.

4. The method of claim 1, wherein the calculating of the estimated handling resources includes an apportionment of handling resources to specifically handle callbacks.

5. The method of claim 1, wherein the forecasting of the customer service transaction workload for the handling resources includes calculating periods of positive net staffing of resources.

6. The method of claim 5, wherein positive net staffing is if a current number of resources staffed exceeds a required number of resources staffed.

7. The method of claim 1, wherein the forecasting of the customer service transaction workload for the handling resources includes calculating periods of maximum net staffing of resources.

8. The method of claim 1, including setting a confidence level, wherein the confidence level is a probability that a length of time a customer would wait in queue is less than a wait for the scheduled callback time.

9. The method of claim 8, wherein determining the scheduled callback time includes using the confidence level and a probability distribution for the wait in the queue.

10. The method of claim 9, wherein the probability distribution for the wait in queue is based upon at least one of an analysis of customer service transaction forecasts, estimated handling resources, and historical data regarding actual wait times.

11. The method of claim 8, wherein a customer provides the confidence level.

12. The method of claim 1, further including:
offering the callback time for customer service to a customer; and
receiving and storing a decision by the customer to accept the offered callback time.

13. The method of claim 12, including receiving an alternate callback time from the customer.

14. The method of claim 13, including offering a new callback time based upon the received alternate callback time.

15. The method of claim 12, including scheduling and storing a callback time for customer service if the customer accepts the offered callback time.

16. The method of claim 12, including collecting customer contact information for the callback.

17. The method of claim 16, wherein the customer contact information includes a communications network address.

18. The method of claim 17, wherein the communications network address is an identifier associated with a telephone number obtained from an automatic number identification service.

19. The method of claim 17, wherein the communications network address is an identifier associated with an instant messaging service.

20. The method of claim 16, wherein after collecting the customer contact information, the callback information is verified with the customer.

21. The method of claim 1, including initiating a first callback on a media switch approximately at the scheduled time of the callback.

22. The method of claim 21, wherein the first callback is placed on an optimal media switch.

23. The method of claim 21, wherein the first callback is placed on the media switch that minimizes cost.

24. The method of claim 21, including reserving at approximately the scheduled time of the first callback resources for handling the first callback.

25. The method of claim 24, including verifying a customer's identity if the first callback is answered.

26. The method of claim 25, including connecting the customer to the reserved resources after verifying the customer's identity.

27. The method of claim 26, wherein after the verifying the customer identity, placing the customer in a queue for customer service.

28. The method of claim 27, wherein a customer in the queue has a priority ranking.

29. The method of claim 21, including scheduling a second callback if the customer does not respond to the first callback.

30. The method of claim 21, wherein the workload and available handling resources at approximately the scheduled time of a callback influence, the initiation time of the callback.

31. The method of claim 30, wherein a confidence level and probability distributions of workload and available handling resources at approximately the scheduled time of a callback, influence the initiation time of the callback.

32. The method of claim 1, further including:
receiving a customer service request; and
offering the callback time if an estimated wait time associated with servicing the customer service request equals or exceeds a configurable threshold value, and determining to not offer a callback option if the estimated wait time is less than the threshold.

33. The method of claim 32, including calculating the estimated wait time based upon customer service factors including at least one of, the number of calls in a service request queue, the number of currently scheduled callbacks or the projected resource availability.

34. The method of claim 33, wherein calculating the estimated wait time includes using a confidence wait time based upon a confidence level and a probability distribution.

35. The method of claim 34, wherein the probability distribution for the wait time is based on historical wait times.

36. The method of claim 32, including receiving the customer service request on a media switch through a communications network wherein the estimated wait time is calculated based on variability of available handling resources.

37. The method of claim 36, wherein the communications network is a public switched telephone network and the configurable threshold varies from time interval to time interval.

38. The method of claim 36, wherein the media switch is an automatic call distributor and the estimated wait time is calculated by performing a regression calculation of average time to advance during a recent past time period against handling resources available during the recent past time period.

39. The method of claim 36, wherein the communications network is a data network and the estimated wait time is computed as a confidence wait time which reflects increasing uncertainty and changes in wait time distribution as queue size increases.

40. The method of claim 36, wherein the media switch is a network server supporting instant messaging.

41. The method of claim 36, wherein the media switch is a network server supporting voice over Internet.

42. A system for scheduling a callback time for customer service, the system including:
a processor tracking module programmed to calculate estimated total handling resources available during a future time interval for a customer interaction system;
a processor forecasting module programmed to forecast a customer service transaction workload for the estimated handling resources of the customer interaction system, including determining expected values and confidence limits for forecasted transactions and forecasted handling times for the future time interval;

a processor callback module programmed to determine the callback time based upon the estimated handling resources and the forecasted customer service transaction workload; and wherein the processor tracking module uses projected resource availability based on times resources are scheduled to calculate the estimated handling resources, and the calculated estimate of handling resources is a mean number of handling resources scheduled which is corrected based on deviation between an actual mean number of available resources and the scheduled mean number of resources over recent past time intervals.

43. The system of claim 42, wherein the tracking and forecasting module use a predetermined forecast time interval for the estimated handling resources and the customer service transaction workload.

44. The system of claim 42, wherein the callback module calculates net staffing in order to determine the callback time.

45. The system of claim 44, wherein positive net staffing is when a current number of resources staffed exceeds a required number resources staffed.

46. The system of claim 42, wherein the tracking module includes an apportionment of handling resources to specifically handle callbacks.

47. The system of claim 42, wherein the forecast module of the customer service transaction workload for the handling resources includes calculating periods of maximum net staffing.

48. The system of claim 42, wherein the callback module determines the callback time including setting a confidence level.

49. The system of claim 48, wherein the callback module sets a confidence level based upon a probability that a length of time a customer would wait in queue is less than a wait for the scheduled callback time.

50. The system of claim 49, wherein the determining the scheduled callback time includes using the confidence level and a calculated probability distribution for the wait in the queue.

51. The system of claim 50, wherein the probability distribution for the wait in queue is based upon at least one of an analysis of customer service transaction forecasts, estimated handling resources, and historical data regarding actual wait times.

52. The system of claim 48, wherein a customer provides the confidence level.

53. The system of claim 42, wherein the callback module offers the callback time for customer service to a customer and receives and stores a decision by the customer whether to accept the offered callback time.

54. The system of claim 53, wherein the callback module receives an alternate callback time from the customer.

55. The system of claim 54, wherein the callback module offers a new callback time based upon the receiving the alternate callback time.

56. The system of claim 53, including a scheduling module to schedule and store a callback time for customer service if the customer accepts the offered callback.

57. The system of claim 56, wherein the scheduling module collects customer contact information for the callback.

58. The system of claim 57, wherein the customer contact information includes a communications network address.

59. The system of claim 58, wherein the communications network address is a telephone number obtained from an automatic number identification service.

60. The system of claim 58, wherein the communications network address is an identifier associated with an instant messaging service.

61. The system of claim 56, wherein the scheduling module triggers the callback module to initiate a first callback on a media switch at approximately the scheduled time of the callback.

62. The system of claim 61, wherein the callback module places the first callback on an optimal media switch.

63. The system of claim 61, wherein the callback module places the first callback on the media switch that minimizes cost.

64. The system of claim 61, wherein the scheduling module at approximately the scheduled time of the first callback reserves resources for handling the first callback.

65. The system of claim 64, wherein the callback module verifies the customer identity if the first callback is answered.

66. The system of claim 65, wherein the callback module connects the customer to the reserved resources after verifying the customer's identity.

67. The system of claim 65, wherein the callback module after verifying customer identity places the customer in a queue for customer service.

68. The system of claim 67, wherein the customer in the queue has a priority ranking.

69. The system of claim 61, wherein the scheduling module schedules a second callback if the customer does not respond to the first callback.

70. The system of claim 69, wherein the callback module accepts input from the customer for another callback time.

71. The system of claim 70, wherein the callback module offers a new callback time based upon the entered callback time, the estimated handling resources and the forecasted customer service transaction workload.

72. The system of claim 42, wherein prior to scheduling the callback time, the callback module receives a customer service request, calculates an estimated wait time associated with servicing the customer request, and offers the callback time if the estimated wait time associated with servicing the customer service request exceeds a configurable threshold value and determines to not offer a callback option if the estimated wait time is less than the threshold.

73. The system of claim 72, wherein the callback module calculates the estimated wait time based upon customer service factors including at least one of, the number of calls in a service request queue, the number of currently scheduled callbacks or the projected resource availability.

74. The system of claim 73, wherein the callback module calculates the estimated wait time using a confidence wait time based upon a confidence level and a probability distribution.

75. The system of claim 74, wherein the calculation of the probability distribution for the confidence wait time is based on historical wait times.

76. The system of claim 72, wherein the callback module receives the customer service request on a media switch through a communications network wherein the estimated wait time is calculated based on variability of available handling resources.

77. The system of claim 76, wherein the communications network is a public switched telephone network and the configurable threshold is varied from time interval to time interval.

78. The system of claim 76, wherein the media switch is an automatic call distributor and the estimated wait time is calculated by performing a regression calculation of average time to advance during a recent past time period against handling resources available during the recent past time period.

79. The system of claim 76, wherein the communications network is a data network and the estimated wait time is computed as a confidence wait time which reflects increasing uncertainty and change in wait time distribution as queue size increases.

80. The system of claim 76, wherein the media switch is a network server supporting instant messaging.

81. The system of claim 76, wherein the media switch is a network server supporting voice over Internet.

82. A machine readable medium storing a set of instructions that, when executed by a machine, cause the machine to:
   calculate estimated total handling resources available during a future time interval for a customer interaction system;
   forecast a customer service transaction workload for the estimated handling resources of the customer interaction system including determining expected values and confidence limits for forecasted transactions and forecasted handling times for the future time interval;
   determine the callback time based upon the estimated handling resources and the forecasted customer service transaction workload;
   wherein the calculating and the forecasting includes using a predetermined forecast time interval for the estimated total handling resources and the customer service transaction workload, and the calculated estimate of handling resources is a mean number of resources scheduled which is corrected based on deviation between an actual mean number of available resources and the scheduled mean number of resources over recent past time intervals.

83. A system to schedule a callback time for customer service, the system including:
   a first means for calculating estimated total handling resources available during a future time interval for a customer interaction system;
   a second means for forecasting a customer service transaction workload for the estimated handling resources of the customer interaction system including determining expected values and confidence limits for forecasted transactions and forecasted handling times;
   a third means for determining the callback time based upon the estimated handling resources and the forecasted customer service transaction workload; and
   wherein the means for calculating uses projected resource availability based on times resources are scheduled to calculate the estimated handling resources, and the calculated estimate of handling resources is a mean number of handling resources scheduled which is corrected based on deviation between an actual mean number of available resources and the scheduled mean number of resources over recent past time intervals.

* * * * *